United States Patent Office 3,520,876
Patented July 21, 1970

3,520,876
PROCESS FOR THE PREPARATION OF 6-(ALPHA-AMINOACYLAMINO)PENICILLANIC ACIDS
Harvey E. Alburn, West Chester, Donald E. Clark, Norristown, and Norman H. Grant, Wynnewood, Pa., assignors to American Home Products Corporation, New York, N.Y., a corporation of Delaware
No Drawing. Filed Nov. 1, 1967, Ser. No. 679,657
Int. Cl. C07d 99/16
U.S. Cl. 260—239.1                                  3 Claims

ABSTRACT OF THE DISCLOSURE

6 - ($\alpha$ - aminoacylamino)penicillanic acids with broad spectrum antibacterial activity are obtained rapidly and in high yield, without the need to isolate them from dilute solutions, by an improved process comprising condensing and precipitating in one step the product from the addition of a mixture of an N-carboxyanhydride of an amino acid with a stoichiometrically-equivalent amount of a mono-, di- or tri-carboxylic organic acid to a concentrated, e.g., greater than 1%, preferably, 5–40% by weight, aqueous suspension of 6-aminopenicillanic acid.

This invention relates to the preparation of penicillins and more particularly to an improved method for preparing 6 - (alpha - aminoacylamino)penicillanic acids, which, together with their non-toxic salts, show a desirable broad spectrum of anti-bacterial activity.

Background of the invention

The instant invention contemplates improvements in the preparation of penicillins of Formula I:

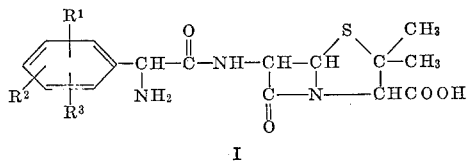

wherein $R^1$, $R^2$ and $R^3$, independently are hydrogen, nitro, di - (lower)alkylamino, (lower)alkanoylamino, (lower)-alkanoyloxy, (lower)alkyl, (lower)alkoxy, sulfamyl, chloro, iodo, bromo, fluoro or trifluoromethyl. When used herein and in the appended claims, the term "(lower) alkyl" and derivations thereof such as "(lower)alkanoyl," "(lower)alkanoyloxy," and "(lower)alkoxy" includes organic radicals straight and branched chain containing from about 1 to about 6 carbon atoms. Illustrative of such groups are, therefore, methyl, ethyl, n-propyl, i-propyl, n-butyl, t-butyl, 3-methylpentyl, n-hexyl; formyl, acetyl, n-propionyl, i-propionyl, n-butyroyl, t-butyroyl, 3-methyl-pentanoyl, n-hexanoyl; formyloxy, acetyloxy, n-propionyloxy, i-propionyloxy, n - butyroyloxy, t - butyroyloxy, 3-methylpentanoyloxy, n - hexanoyloxy; and methoxy, ethoxy, n-propoxy, i-propoxy, n-butoxy, t-butoxy, 3-methylpentoxy, n-hexoxy, and the like.

As is stated in U.S. 2,985,648, the compounds defined above are of value as anti-bacterial agents, nutritional supplements in animal feed; agents for the treatment of mastitis in cattle; and as therapeutical agents in poultry and mammals, including man, in the treatment of infectious diseases caused by gram-positive and gram-negative bacteria, upon either parenteral or oral administration. Moreover, the compounds show marked resistance to destruction by acids.

Heretofore it has been proposed to prepare the penicillins of Formula I by acylation processes such as those shown, for example, in U.S. 2,985,648. In one such procedure, the amino group of the amino acid reactant to be used has to be blocked with a protecting acyl group, an anhydride has to be formed from the protected amino acid, the protected anhydride has to be reacted with 6-aminopenicillanic acid (6–APA) and then the protecting group must be removed by catalytic hydrogenation to obtain the desired penicillanic acid derivative. Those skilled in the art are well-aware of the tendency for sulfur-containing molecules to poison hydrogenation catalysts and this characteristic of the compound has made it extremely difficult to obtain pure 6-($\alpha$-aminoacylamino)penicillanic acids in high yields by the said method. Later it was proposed to prepare these valuable penicillins by condensing 6–APA with an N-carboxyanhydride (NCA) of the appropriate amino acid, forming the penicillin and splitting off carbon dioxide. These proposals would be viewed generally pessimistically because of the liability of the said N - carboxyanhydride to undergo extremely facile polymerization. Instead of obtaining the desired penicillin, there are obtained dipeptides and large polypeptides, and substantial amounts of amino acid (from the anhydride), N - carboxyamino acid, various carbamic acids, ureido derivatives and hydantoins. More recently a means has been found to condense 6–APA with the N-carboxyanhydride and avoid the problems caused by the above mentioned polymerization reactions and hydrolyses. This means employs the surprising finding that the condensation goes smoothly in an aqueous medium, substantially free of organic solvents, on the acid side of neutrality, with retention of configuration and no hydrolysis. The aforesaid process resulted from a study of many variables including pH, solvent type, concentration of reactants, effect of added detergents and of added amines, and reactant ratios and the study is discussed by N. H. Grant and H. E. Alburn in J. Am. Chem. Soc., 86, 3870 (1964). In referring to the condensation of the N-carboxyanhydride with 6–APA, it is therein stated that "Raising the concentration of either reactant above 1% brings a leveling off in the extent of conversion." As a result, for some time, those skilled in the art have employed reaction mixtures containing at most about 1% (and often even less concentrated solutions) of the reactants. It will be recognized, and, in fact, it is taught, that recovery of the penicillin prepared by condensation in such dilute solutions will involve isolation of a relatively small amount of desired product from a large amount of solvent. It is immediately obvious that it would be advantageous to provide a means to eliminate the necessity for a separate isolation step. Heretofore, isolation of product has been achieved in several ways, all with attendant shortcomings. If the solvent is the major contaminant then isolation can be carried out by solvent removal, for example, by evaporation or, in certain cases, freeze-drying. Thus, in U.S. 3,206,455, the product is isolated by freeze-drying. The disadvantages of freeze-drying are that very large volumes must be handled, and the product is light, fluffy and amorphous, making subsequent formulation into useful dosage forms difficult or impossible without a densification step. Removal of a solvent by evaporation can result in a crystallization of the product, but it is difficult with a high boiling solvent, such as water; very elaborate and expensive equipment is necessary in order to keep the temperature low enough to avoid decomposing the product. A third method—precipitation of the product as an insoluble salt such as an arylsulfonate—requires the extra costly steps of acidification, reconstitution of the precipitate and decomposition of the salt. In the co-pending application of N. H. Grant, D. E. Clark and H. E. Alburn, Ser. No. 656,668, filed on July 28, 1967, it is disclosed that it is now possible, in the case of NCA's of aminoalicyclic and aminoarylalicyclic acids, to accomplish the preparation of the penicillin in essentially a one step process wherein the condensation and isolation is carried out in a very concentrated solution, e.g., from about 5% to about 40% by weight of 6–APA. This is especially surprising in view of the present state of the art which clearly teaches that reactant concentrations above 1% will cause lower yields to be obtained. In fact, with that instant process, not only does the desired product precipitate from the reaction mixture whereby it can be simply collected by filtration, centrifugation and the like, but it is obtained in much higher yields than heretofore thought possible. However, with highly reactive N-carboxyanhydrides, such as those of D-phenylglycine and most of the natural amino acids, even if the technique of the said co-pending application is employed, and the reactions are run at a concentration even slightly above a 1% solution of the 6–APA, the NCA tends to polymerize rather than to react in the desirable fashion. It would be desirable to provide, therefore, a means permitting the more reactive and labile NCA's to react in higher concentrations to obtain higher yields in fewer recovery steps and such a means is the subject of this invention.

It is, accordingly, a primary object of the instant invention to provide an improved means to obtain 6-($\alpha$-aminoacylamino)penicillanic acids.

It is a further object to provide 6-($\alpha$-aminoacylamino)-penicillanic acids in better yield than heretofore, especially on a large scale.

A further object of the instant invention is to provide 6-($\alpha$-aminoacylamino)penicillanic acids by a means which avoids the need to freeze-dry large volumes of solution, crystallize them from dilute solutions, or precipitate them as insoluble salts from dilute solutions.

Still another object of this invention is to provide 6-($\alpha$-aminoacylamino)penicillanic acids in a form which does not require densification prior to formulation into pharmaceutical dosage forms.

Description of the invention

These and other objects readily apparent to those skilled in the art are achieved by practice of the instant invention which is, in essence: A process for the preparation of a penicillin of Formula I:

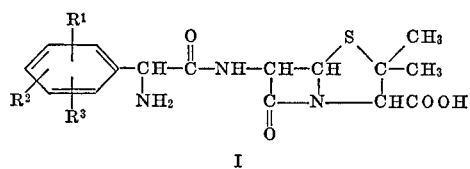

I wherein $R^1$, $R^2$ and $R^3$, independently, are hydrogen, nitro, di(lower)alkylamino, (lower)alkanoylamino, (lower)alkanoyloxy, (lower)alkyl, (lower)alkoxy, sulfamyl, chloro, iodo, bromo, fluoro or trifluoromethyl, which comprises reacting, in an aqueous acidic medium at a pH of from about 3.8 to about 6.2, at a temperature of from just above the freezing point of the mixture to about 37° C., 6-aminopenicillanin acid of Formula II

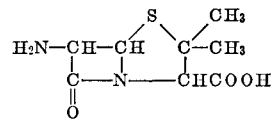

II in an amount to provide at least about 1% by weight of the total reaction mixture, with a mixture of an amino acid N-carboxyanhydride of Formula III

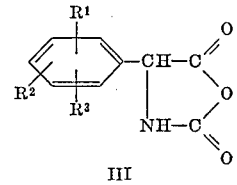

III wherein R1, $R^2$ and $R^3$ are as above defined and a mono-, di- or tricarboxylic organic acid wherein said carboxyl groups are attached to a radical selected from unsubstituted (lower)alkylaryl, (lower)alkyldiaryl, aryl, diaryl, (lower)alkyl, (lower)alicyclic or benzopyrone and hydroxy, (lower)alkoxy, (lower)alkylthio, (lower)alkylamino or (lawer)alkylcarbamyl derivatives thereof, until formation of said penicillin is substantially complete, and recovering said penicillan.

Special mention is made of several valuable embodiments of this invention. Theese are: A process as above defined wherein said organic acid is selected from the group consisting of— phenylacetic acid
phenoxyacetic acid
cyclohexane-1,4-diacetic acid
1,3,5-benzenetricarboxylic acid
3,3-dimethylglutaric acid
phenylsuccinic acid
benzylic acid
3,4-dimethoxyphenylacetic acid
N-phthaloylaminoacetic acid
N-cyclohexyl-$\beta$-aminopropionic acid
phenylmercaptoacetic acid
phthalic acid
o-methoxyphenylacetic acid
m-methoxybenzoic acid
methoxyacetic acid
4-hydroxyisophthalic acid
o-phenylenediacetic acid
cyclohexane-1,1-bis(3-mercaptopropionic acid)
cyclohexane-1,1-bis(3-mercaptoacetic acid)
cyclohexane-1,1-bisacetic acid
$\alpha$-hydroxy-$\alpha$-phenylpropionic acid
aurintricarboxylic acid
3,3-diethylglutaric acid
diphenic acid
$\beta$-hydroxy-$\alpha$-phenylpropionic acid
$\beta$-umbelliferoneacetic acid and
S-o-carboxyphenylthioglycolic acid; and a process as above defined wherein the said N-carboxyanhydride is derived from D-phenylglycine. This embodiment provides the valuable penicillin, 6-D-($\alpha$-aminophenylacetamido)penicilanic acid, also known as ampicillin.

6-aminopenicillanic acid (6–APA, II) is prepared easily by numerous methods now available to those skilled in the art. For example, the procedure of Alburn, Grant and Clark, U.S. 3,032,473, can be used.

The other starting material, the N-carboxyanhydrides of amino acids (III) are prepared in several well-known ways, the most useful of which appears to be phosgenation of a suitable amino acid. These methods are outlined, for example, in the references cited in N. H. Grant and H. E. Alburn, Journal of the American Chemical Society, 86, 3870(1964). The reaction comprises generally treatment of a suitable amino acid with phosgene. Preferably, in said phosgenation procedure, the amino acid reactant is dissolved or suspended in dioxane, phosgene is introduced into the reaction mixture, and the resulting anhydride is crystallized by the addition of an agent such as benzene.

In lieu of 6-aminopenicillanic acid, the salts thereof, such as the sodium or potassium salts, prepared in conventional manner from the acid, may be substituted in the reaction mixture containing the NCA. However, due to the basicity of such salts, adjustment of the reaction mixture containing them is required to bring them within the specified pH range, also the yields obtained therefrom are undesirably diminished.

It is, at present, unclear why the much improved yields of the penicillins are obtained by having carboxylic acids present during the reaction of the N-carboxy-anhydrides of amino acids with 6-aminopenicillanic acid. As is mentioned above, the amino acid NCA's are very reactive and, if high concentrations are used, there is a tendency for them to polymerize rather than to react with 6-APA. Therefore, if the NCA could be *stabilized* so that it would react only with 6-APA, higher concentrations could be used, and the additional steps required for isolating the pencillin might be reduced or eliminated. The compounds found to stabilize the NCA all have carboxyl groups which are capable of associating with the —NH— or >C=O groups of the NCA ring (oxazolidinedione ring) by hydrogen bonding. A number (but by no means, all) of the highly efficient stabilizers for the aryl-substituted NCA's of Formula III, themselves contain aryl rings suggesting the possibility that stabilization may also be enhanced by hydrophobic bonding between the aryl groups of the respective compounds.

Initial trials were carried out with aryl acids added to the 6-APA and the mixture neutralized prior to the addition of the NCA. Among the most effective carboxylic acids were benzilic acid and phenoxyacetic acid and, starting with a 5% solution of 6-APA rather than the approximately 1% solution currently used in large-scale commercial manufacture, about 50% conversion yields of ampicillin were obtained with the N-carboxyanhydride derived from D-phenylglycine. This was about double the yield obtainable at this 6-APA concentration without the carboxylic acid being added.

Subsequent trials involved dissolving the carboxylic acid and the NCA in a co-solvent, such as ethyl acetate, evaporating the mixture to dryness and then adding the dry, solid residue to vigorously stirred sodium 6-APA solution at 0° C. Under these conditions, starting with an 8% solution of 6-APA and using a 1:1 phenoxyacetic acid-D-phenylglycine NCA-ratio, approximately a 70% conversion yield was obtained. On processing the material precipitated from this reaction mixture through to the purified anhydrous form of ampicillin by the technique of refluxing in isopropanol and controlled amounts of water disclosed and claimed by H. E. Alburn and N. H. Grant in U.S. Pat. No. 3,299,046, a 47% overall yield of anhydrous ampicillin was obtained, and the product was 91% pure.

A number of variable were studied to determine their effect on the yield in the new process. For example, the ratio of carboxylic acid to NCA does not appear to be particularly critical—yields at a 1:1 ratio are somewhat better than at 2:1 or 3:1 and also are somewhat better than when the ratio of acid:NCA is less than 1:1—there is no advantage, therefore, to be gained by varying the ratio on either side of 1:1. At least about 1% by weight of 6-APA in the mixture provides the above-mentioned advantages (less than 1% makes recovery expensive) and 5% is preferred, although 10% and even 20% or more of 6-APA can be used. At the higher levels there is noted a tendency for the conversion yields to fall off—there is no advantage to be gained, therefore, by increasing the amount of 6-APA above, say, about 20% by weight. Under most conditions a pH of from about 3.8 to about 6.2 and especially about 5 is preferred for optimum yields although values outside of this range have been studied and it has been noted that the yields were best at pH's closest to 5 when the reaction is carried out at pH 10, 8, 7, 4, 3.5, 3 and 2. At pH 4 and 3.5, the yields decreased only about 13–20%, compared to those at pH 5, while at the other pH values, decreases in yield ranging from 43 to 59% were seen. The best yields were found in substantially aqueous reaction mixtures. For example, only half the usual conversion yield was obtained if methylene chloride, dimethyl-1,4 - cyclohexanedicarboxylate or n-butyl phosphate were substituted for an aqueous reaction mixture, and no yield at all was obtained in methylene chloride, polyphosphoric acid, dimethylhexahydroterephthalate or phenylethylene phosphate. If a minor amount of non-aqueous solvent is added there seems to be no substantial effect on yield—for example, addition of 33% by weight of benzene to an aqueous reaction mixture had no effect on the yield of product obtained. Finally, temperature has some effect on the process yield, but, generally speaking, the condensation is preferred to be carried out at a temperature above about the freezing point of the mixture and about 37° C. It is found, for example, that best yields are obtained at temperatures of about 0° C., and that at 37° C., the yields decrease by only about 20%. Above this temperature, there is a tendency for the yields to decrease even more and eventually there could even be a temperature above which the advantages gained in the instant process might be lost altogether.

A wide variety of acids can be used in the instant process so long as they met the following limitations: they must be a mono-, di- or tricarboxylic organic acid wherein said carboxyl groups are attached to a radical selected from unsubstituted (lower)alkylaryl, (lower)alkyldiaryl, aryl, diaryl, (lower)alkyl, (lower)alicyclic or benzopyrone and hydroxy, (lower)alkoxy, (lower)alkylthio, (lower)alkylamino or (lower)alkylcarbamyl derivatives thereof. In defining the effective stabilizers in this manner, many organic acids were tested and their effect on yield were determined. Generally speaking, it is desirable to have more than one carboxyl group if one is attached directly to a ring; to have a six-membered ring; to have an alkylene, e.g. methylene, group rather than carbonyl between the ring and carboxyl; to have an aryl, e.g. benzene, rather than heteroaryl, e.g., pyridine, ring; to have alkyl substitution on dicarboxylic aliphatic acids; and to have no amino groups on any ring. The presence of hydroxy, (lower)alkoxy or thio ether groups in the molecule is beneficial, while the presence of keto or aldehyde groups can have a deleterious effect.

Description of the preferred embodiments

The following examples are illustrative of the processes of this invention. They are not to be construed as limiting the scope hereof in any manner whatsoever.

EXAMPLE 1

Equimolar amounts of D-phenylglycine N-carboxyanhydride (NCA, prepared by the procedure in J. Am. Chem. Soc., 86, 3870 (1964)) and phenoxyacetic acid are dissolved in ethyl acetate and the mixture is evaporated to dryness. Fifteen grams of 6-aminopenicillanic acid (6-APA, prepared by the procedure in U.S. 3,032,-473) is dissolved in 285 ml. of water containing 2.7 g. of sodium hydroxide and the mixture is chilled to 0° C. One ml. of capryl alcohol (anti-foaming agent) is added, followed by 22.4 g. of the NCA-phenoxyacetic acid mixture. After one-half hour, the reaction mixture is filtered. Bio-assay of the filtrate shows it to contain 13.6 g. of ampicillin (56% conversion). Eleven ml. of 6 N hydrochloric acid is added to the filtrate and it is extracted with two 300 ml. volumes of ethyl acetate and again filtered. This precipitate (1.5 g.) has very little biological activity. The pH of the filtrate is adjusted to 4.8 with NaOH, chilled, and then filtered. The precipitate, 9.5 g., is ampicillin trihydrate of high purity by hydroxamate assay. The filtrate, 285 ml., is concentrated to 75 ml., chilled and filtered. This step yields an additional 3.1 g. of trihydrate to give a total of 12.6 g. of ampicillin trihydrate of 100% purity.

A process carried out in a substantially identical manner, without phenoxyacetic acid, yielded only 6.3 g. of ampicillin trihydrate. The ratio of carboxylic acid conversion yield to control yield therefore is 2.0.

EXAMPLE 2

Fifteen grams of 6–APA is dissolved in 285 ml. of water containing 2.7 g. of sodium hydroxide and the mixture is chilled to 0° C. This solution is placed in a pre-chilled high speed blender along with 1 ml. of capryl alcohol. A stoichiometric mixture, 22.5 g., of D-phenylglycine NCA-phenoxyacetic acid, dried from ethyl acetate solution as in Example 1, is added, the mixture is stirred for 8 minutes, then put in a beaker surrounded by an ice bath, and stirring was continued for 30 minutes. The precipitate is filtered off and dried. It weighs 6.6 g. and assays as 70% ampicillin. To the filtrate, which contains 10.4 g. of ampicillin, there is added 11 ml. of 6 N hydrochloric acid. The mixture is extracted with two 300 ml. portions of ethyl acetate and the aqueous portion is adjusted to pH 4.8. This provides a precipitate which, after drying, weighs 8.3 g. The filtrate is concentrated to 85 ml. and chilled, providing a precipitate weighing 2.9 g., after drying. The three above-mentioned precipitates are combined and refluxed for 10 minutes in 100 ml. of 85% isopropanol. The residue weighs 13.3 g. after recovery filtration and drying. It is anhydrous ampicillin of 90% purity; the yield is 49.5%.

EXAMPLE 3

The procedure of Example 1 is repeated, substituting for the phenoxyacetic acid, stoichiometrically-equivalent amounts of the following listed organic carboxylic acids and the following listed ratios of conversion yields to control yield are obtained:

Phenylacetic acid _____ 1.71
Cyclohexane-1,4-diacetic acid _____ 1.94
1,3,5-benzenetricarboxylic acid _____ 1.65
3,3-dimethylglutaric acid _____ 1.92
Phenylsuccinic acid _____ 2.26, 1.56
Benzylic acid _____ 2.18, 1.67, 2.06
3,4-dimethoxyphenylacetic acid _____ >2.41, 1.55
N-phthaloylaminoacetic acid _____ 1.85
N-cyclohexyl-β-aminopropionic acid _____ 1.91
Phenylmercaptoacetic acid _____ 2.18, 1.72, 1.41, 1.74
Phthalic acid _____ >2.13, 1.61
o-Methoxyphenylacetic acid _____ 1.52
m-Methoxybenzoic acid _____ 1.56
Methoxyacetic acid _____ 1.73
4-hydroxyisophthalic acid _____ 1.68
o-Phenylenediacetic acid _____ 1.72
Cyclohexane-1,1-bis(3-mercaptopropionic) acid __ >1.90
Cyclohexane-1,1-bis(3-mercaptoacetic) acid _____ >1.90
Cyclohexane-1,1-bisacetic acid _____ 1.55
α-Hydroxy-α-phenylpropionic acid _____ 1.98
Aurintricarboxylic acid _____ 1.83
3,3-diethylglutaric acid _____ 2.00
Diphenic acid _____ 1.88
β-Hydroxy-α-phenylpropionic acid _____ 1.68
β-Umbelliferoneacetic acid _____ 1.57
S-o-carboxyphenylthioglycolic acid _____ 2.06

In all cases, the addition of the named organic carboxylic acid enhanced substantially the conversion yield in comparison to that of the control.

EXAMPLE 4

The procedure of Example 1 is repeated, substituting for the D-phenylglycine NCA, stoichiometrically-equivalent amounts of the following NCA's.

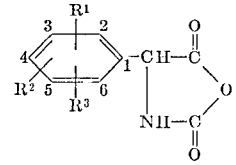

| R¹ | R² | R³ |
|---|---|---|
| H | 4-NO₂ | H |
| 2-NO₂ | H | H |
| H | 4-(C₂H₅)₂N– | H |
| 2-CH₃CONH– | H | H |
| H | 4-CH₃CO₂– | H |
| H | 3-CH₃ | H |
| 2-CH₃ | 4-CH₃ | 6-CH₃ |
| H | 4-(CH₃)₃C | H |
| H | 4-CH₃(CH₂)₄CH₂– | H |
| 3-(CH₃)₃C– | 4-CH₃CO₂– | 6-(CH₃)₃C– |
| H | 4-CH₃O– | H |
| 2-CH₃O– | 3-CH₃O– | 4-CH₃O– |
| H | 4-CH₃(CH₂)₄CH₂O– | H |
| H | 4-H₂NSO₂– | H |
| H | 4-Cl | H |
| 2-Cl | 4-Cl | 6-Cl |
| 2-I | H | H |
| H | 4-Br | H |
| 2-Br | 4-Br | H |
| H | 4-F | H |
| H | 4-CF₃ | H |

The following penicillins are obtained in substantially the same manner:

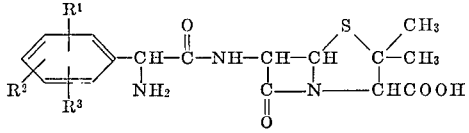

| R¹ | R² | R³ |
|---|---|---|
| H | 4-NO₂ | H |
| 2-NO₂ | H | H |
| H | 4-(C₂H₅)₂N– | H |
| 2-CH₃CONH– | H | H |
| H | 4-CH₃CO₂– | H |
| H | 3-CH₃ | H |
| 2-CH₃ | 4-CH₃ | 6-CH₃ |
| H | 4-(CH₃)₃C | H |
| H | 4-CH₃(CH₂)₄CH₂– | H |
| 3-(CH₃)₃C– | 4-CH₃CO₂– | 6-(CH₃)₃C– |
| H | 4-CH₃O– | H |
| 2-CH₃O– | 3-CH₃O– | 4-CH₃O– |
| H | 4-CH₃(CH₂)₄CH₂O– | H |
| H | 4-H₂NSO₂– | H |
| H | 4-Cl | H |
| 2-Cl | 4-Cl | 6-Cl |
| 2-I | H | H |
| H | 4-Br | H |
| 2-Br | 4-Br | H |
| H | 4-F | H |
| H | 4-CF₃ | H |

EXAMPLE 5

The procedure of Example 1 is repeated substituting stoichiometrically-equivalent amounts of the NCA's tabulated in Example 4 for the D-phenylglycine NCA and stoichiometrically-equivalent amounts of the organic acids tabulated in Example 3 for phenoxyacetic acid and the respective penicillins are obtained in substantially the same manner as in Example 1.

We claim:
1. A process for the preparation of a penicillin of the formula

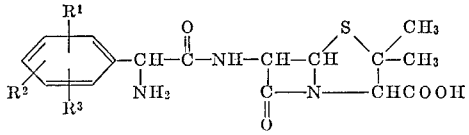

wherein R¹, R² and R³, independently, are hydrogen, nitro, di(lower)alkylamino, (lower)alkanoylamino, (lower) alkanoyloxy, (lower)alkyl, (lower)alkoxy, sulfamyl, chloro, iodo, bromo, fluoro or trifluuoromethyl, which comprises reacting, in an aquueous acidic medium at a pH of from about 3.8 to about 6.2, at a temperature of from just above the freezing point of the mixture to about 370 C., 6-aminopenicillanic acid of the formula

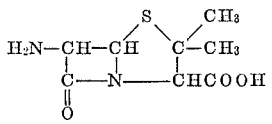

in an amount to provide at least about 1% by weight of the total reaction mixture, with a mixture of an amino acid N-carboxyanhydride of the formula

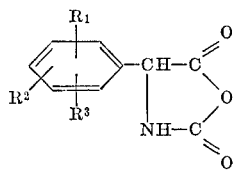

wherein $R^1$, $R^2$ and $R^3$ are as above defined and a mono-, di- or tricarboxylic organic acid which is selected from the group consisting of:
phenylacetic acid
phenoxyacetic acid
cyclohexane-1,4-diacetic acid
1,3,5-benzenetricarboxylic acid
3,3-dimethylglutaric acid
phenylsuccinic acid
benzylic acid
3,4-dimethoxyphenylacetic acid
N-phthaloylaminoacetic acid
N-cyclohexyl-$\beta$-aminopropionic acid
phenylmercaptoacetic acid
phthalic acid
o-methoxyphenylacetic acid
m-methoxybenzoic acid
methoxyacetic acid
4-hydroxyisophthalic acid
o-phenylenediacetic acid
cyclohexane-1,1-bis(3-mercaptopropionic acid)
cyclohexane-1,1-bis(3-mercaptoacetic acid)
cyclohexane-1,1-bisacetic acid
$\alpha$-hydroxy-$\alpha$-phenylpropionic acid
aurintriacarboxylic acid
3,3-diethylglutaric acid
diphenic acid
$\beta$-hydroxy-$\alpha$-phenylpropionic acid
$\beta$-umbelliferoneacetic acid and
S-o-carboxyphenylthioglycolic acid,
until formation of said penicillin is substantially complete, and recovering said penicillin from the reaction mixture as a precipitate.

2. A process as defined in claim 1 wherein the said N-carboxyanhydride is that derived from D-phenylglycine.

3. A process as defined in claim 1 wherein the amount of 6-aminopenicillanic acid provides about 5 percent by weight of the total reaction mixture.

References Cited
UNITED STATES PATENTS
3,206,455  9/1965  Albrion et al. _____ 260—239.1

NICHOLAS S. RIZZO, Primary Examiner

PO-1050
(5/69)

UNITED STATES PATENT OFFICE
CERTIFICATE OF CORRECTION

Patent No. 3,520,876    Dated July 21, 1970

Inventor(s) Harvey E. Alburn, Donald E. Clark, Norman H. Grant

It is certified that error appears in the above-identified patent and that said Letters Patent are hereby corrected as shown below:

Column 4, line 2, "6-aminopenicillanin" should read --6-aminopenicillanic--;
  line 29, "penicillan" should read --penicillin--;
  line 32, "theese" should read --these--.
Column 5, line 63, "variable" should read --variables--.
Column 9, line 4, in claim 1, "370 C." should read --37° C.--; and in
Column 10, line 22, "precipate" should read --precipitate--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents